United States Patent Office 3,015,612
Patented Jan. 2, 1962

3,015,612
CONTINUOUS FERMENTATION APPARATUS FOR THE PRODUCTION OF A CHEMICAL PRODUCT
Stanley John Pirt, Blackheath, London, and Donald Sidney Callow, Bremerton, near Salisbury, England, assignors to National Research Development Corporation, London, England, a British corporation
Filed Feb. 18, 1958, Ser. No. 715,882
Claims priority, application Great Britain Feb. 21, 1957
6 Claims. (Cl. 195—141)

The present invention relates to fermentation processes in which chemical changes are brought about by the action of micro-organisms.

The invention is concerned with continuous fermentation processes in which a chemical product is obtained by a continuous fermentation of a chemical substance by a micro-organism in continuous culture.

A continuous fermentation is commenced by placing a growth medium, which includes the chemical substance (substrate) upon which the micro-organism is to act, in a culture vessel in sterile conditions and then inoculating it with a culture of the micro-organism which proceeds to grow. Whereas in a batch process the rate of growth would eventually fall to zero, a continuous process may be set up by supplying, when the concentration of micro-organisms approaches the maximum possible concentration, the growth medium at a predetermined rate so that the concentration of the micro-organism is thenceforth maintained at a constant level and the chemical product formed continuously at a steady rate. In addition to a system for supplying a growth medium at an accurately controlled and preferably easily variable rate, in order to maintain a continuous fermentation process in a culture vessel it is necessary to have an arrangement for drawing off liquor and harvesting the culture at the rate medium is supplied, and a constant supply of sterile air or oxygen, or, if the micro-organism is anaerobic, a supply of suitable oxygen-free gas such as nitrogen. The pH value and the temperature of the contents of the culture vessel must be closely controlled and usually the intensity of the aeration when required must also be closely controlled.

Although a continuous fermentation process as described above has a greater output rate than that of the corresponding batch process using the same culture vessels, there is usually a decrease and in no case is there any substantial increase in the (generally low) concentration of the product in the output liquor drawn off from the culture vessels and likewise there is usually a decrease and never any substantial increase in the moderate yield of product which may be obtained for a given weight of substrate starting substance. If such a continuous fermentation process is carried out on certain substances the yield and/or the concentration of the product in the output is so low that a continuous process is impracticable or is not preferable to the corresponding batch process.

It has now been discovered that, although the fermentation action of the micro-organism is to produce the chemical product, the conditions in continuous fermentation processes which are most favourable to the formation of the chemical product are different from the conditions which favour the growth of the micro-organism and, furthermore, that a continuous fermentation process for the production of a given substance is made practicable or is improved by carrying out the process simultaneously in two stages, the conditions in the first stage being arranged to be more favourable for the growth of the micro-organisms than for the formation of the chemical proudct while the conditions in the second stage which is supplied continuously with the output of the first stage are arranged to be more favourable for the formation of the chemical product than for the growth of the micro-organisms.

By controlling the two stages independently near optimum conditions can be maintained simultaneously both for micro-organism growth and product formation so that higher yields and higher concentrations of product in the output may be obtained than with a one stage process.

Apparatus for carrying out the two-stage continuous process in its simplest form consists essentially of two culture vessels in series each with its own control apparatus. Growth medium is continuously supplied to the first stage vessel but arrangements may be made for adding direct to the second stage more growth medium or just the substrate which is converted into the chemical product. Where the chemical product discourages growth of the micro-organisms and the substrate is not essential to their growth it is advantageous to exclude the substrate from the growth medium fed to the first stage and feed the substrate solely to the second stage with or without any of the medium essential to growth. It is desirable to hold the micro-organisms in the second stage for as long, or nearly as long, as they can convert the medium into the chemical product and in general this means that it is advantageous for the second stage vessel to be larger than the first (or comprise two or more vessels in series or parallel) so that the dilution rate (the complete volume change rate) in the second stage is less than the dilution rate in the first stage.

In general, the aeration rates in the two stages should be different. In aerobic fermentation processes, the aeration rate in the first stage should be such that conversion of the growth medium takes place at a high rate which encourages rapid growth of the micro-organisms, while the aeration rate in the second stage should be that necessary to bring about the chemical reaction by which the desired product is formed from the substrate. The temperature of the culture in the two should also in general be different and usually the temperature of the first stage should be the higher temperature.

The invention will now be more particularly described with reference to the accompanying drawings in which:

FIGURE 2 shows an apparatus for carrying out the two-stage process; while

Figure 1:
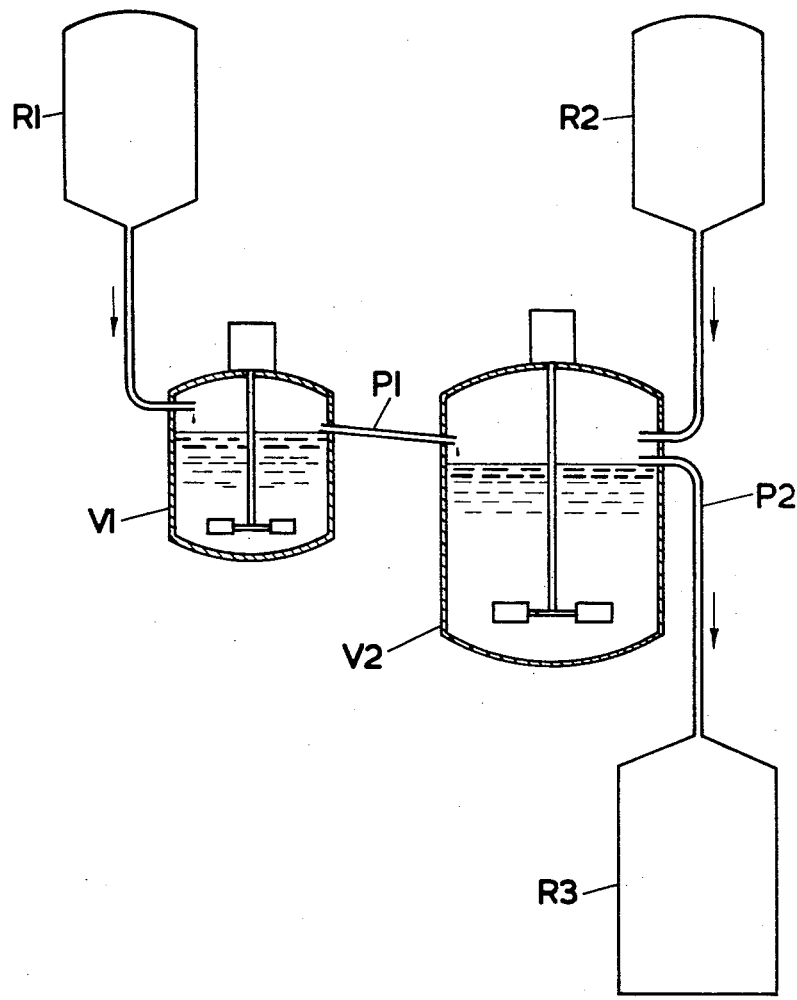
FIGURE 1 shows the basic scheme for a two-stage continuous fermentation process.

As shown in FIGURE 1, the basic two-stage process employs a first culture vessel V1 for the first stage and a second culture vessel V2 of similar construction for the second stage. Generally the volume of culture in the second vessel V2 is made larger than the volume in the first vessel V1 as shown. This is because the optimum time for growth of the micro-organism is generally shorter than the time for which the micro-organism will convert substrate into product. Instead of having two vessels in series with the culture flowing out of the first vessel may be split into more than one stream and fed into several second stage culture vessels in parallel so that, for example, all the culture vessels may be of a standard size. The first stage vessel V1 would of course be made the larger vessel or be two or more vessels if the optimum fermentation conditions required it.

By means of a continuous feed device, medium is fed at a constant rate into the vessel V1 from a reservoir R1 of growth medium which consists of the substrate or starting material which the micro-organism converts into the desired chemical product together with small amounts of essential nutrients for the growth of the micro-organism. The medium in this vessel is inoculated with the micro-organism and the conditions, that is, temperature, pH value, oxygen or gas supply rate, and dilution rate (defined as medium flow rate/volume of culture, the units of which, if flow rate is measured in litres/hour and volume in litres is hour $^{-1}$) are fixed at the desired values. The culture flows out of the first vessel V1 through an overflow pipe P1 at such a rate as to maintain constant the volume of culture in the vessel V1. From the first vessel the culture passes into the second stage vessel V2 where the conditions are different from those in the first vessel. By means of another continuous feed device extra substrate is fed from a reservoir R2 at a constant rate into the second vessel V2. The volume of culture in the second vessel is kept constant by drawing off liquor at the required level through an overflow pipe P2.

The culture which flows out of the second stage vessel is held in a reservoir R3 and the product is recovered from the culture fluid held in this product receiver.

The volume of culture present in either vessel V1 or V2 as well as the medium flow rate may be adjusted to obtain the desired dilution rate.

A two-stage fermentation process as described above is applicable with advantage to many different processes which produce organic chemicals such as antibiotics, enzymes and alcohols by the action of micro-organisms, for example, the production of an antibiotic such as penicillin by the mold. *Penicillium chrysogenum* may be carried out by inoculating a suitable growth medium in the first stage vessel V1 with the mold, delivering growth medium at the required rate from the reservoir R1 and delivering a suitable substrate medium which contains precursors of penicillin from the reservoir R2. The conditions maintained in the vessel V1 are arranged to encourage the rapid growth of the mould while the conditions in the vessel V2 are arranged to be more favourable to the production of penicillin. This effect is pronounced as the mold is able to synthesize penicillin from the precursors delivered to the vessel.

Figure 2:
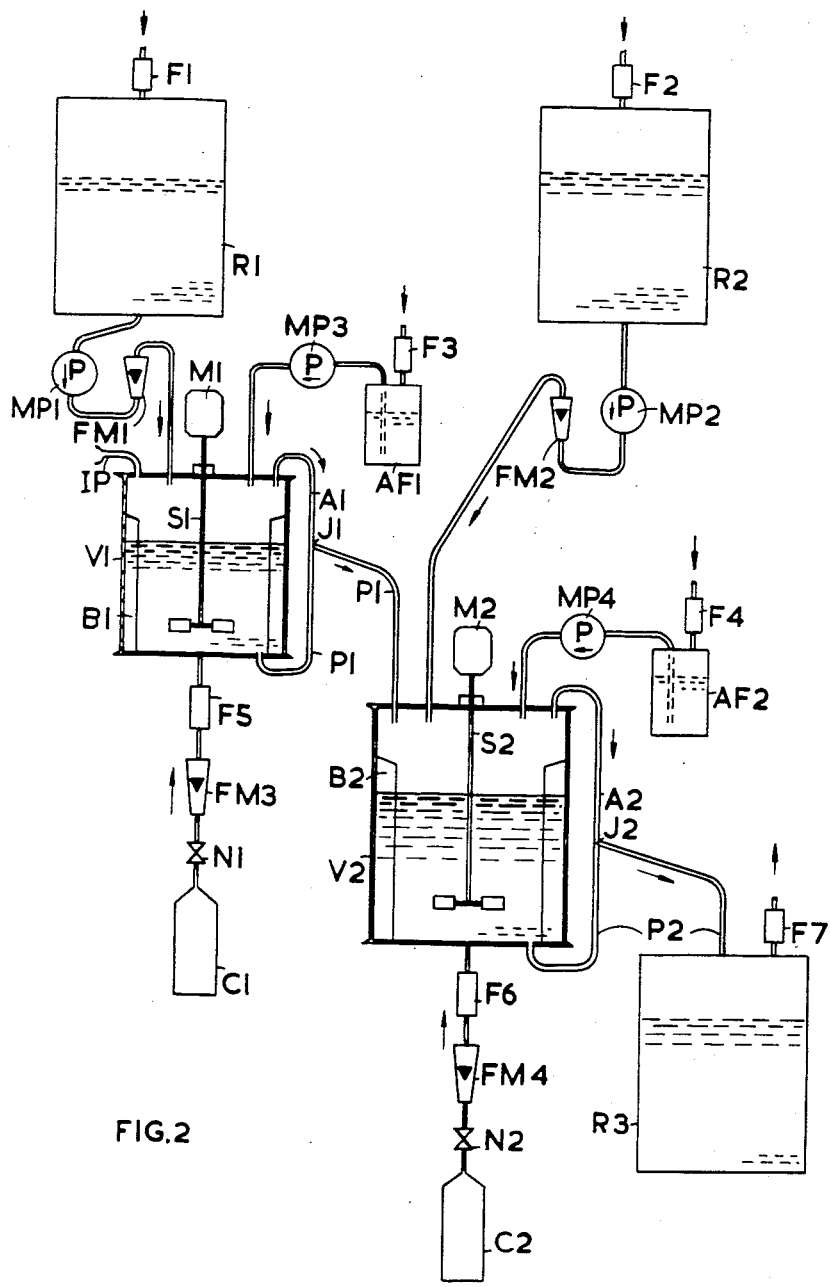
Figure 3:
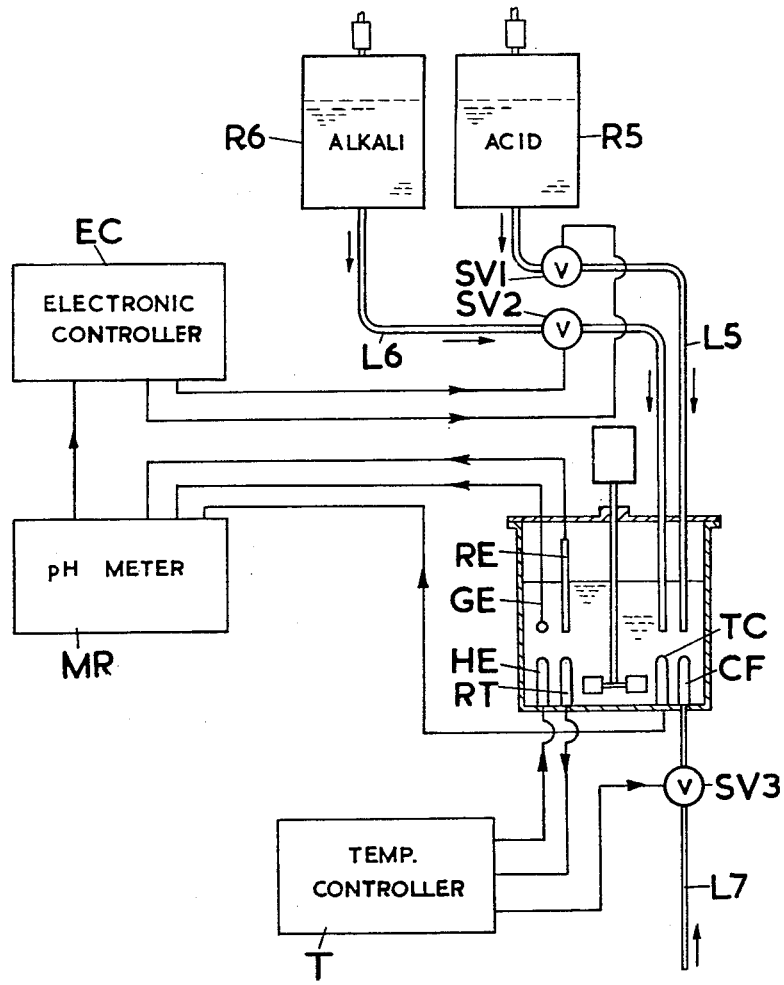
FIGURE 3 shows temperature and pH value control arrangements for each culture vessel shown in FIGURE 2.

Apparatus for carrying out various aerobic two-stage continuous fermentation processes will now be described with reference to FIGURES 2 and 3. The complete apparatus is shown in FIGURE 2 except for the temperature and pH value control arrangements for each culture vessel and consists essentially of the apparatus shown in FIGURE 1, that is a first culture vessel V1, a second stage culture vessel V2, and reservoirs R1, R2 and R3 for the growth medium, the second stage medium and the output culture respectively. One suitable form of culture vessel is described in an article by R. Elsworth, L. R. P. Meakin, S. J. Pirt and G. H. Capell entitled "A Two-Litre Scale Continuous Culture Apparatus for Micro-organisms" (the Journal of Applied Bacteriology, vol. 19, No. 2, December 1956, page 264).

The feed lines from the reservoirs R1 and R2 contain metering pumps MP1 and MP2 and flowmeters FM1 and FM2 so that the supply rates can be regulated. Each culture vessel is provided with a supply of an antifoam agent such as Alkaterge (3 parts) with paraffin (7 parts) as described in the above mentioned article by Elsworth et al. on p. 273. The agent is supplied at a predetermined controlled rate for each culture vessel by metering pumps MP3 and MP4 from containers AF1 and AF2 as shown.

Each culture vessel is supplied with gas from compressed gas cylinders C1 and C2 at a controlled rate through needle valves N1 and N2 and flowmeters FM3 and FM4 as shown. If the fermentation process is aerobic the gas is air or oxygen or contains oxygen while if the process is anaerobic the gas is a non-reactive gas such as nitrogen. The culture vessels V1 and V2 are provided with stirrers S1 and S2 driven by motors M1 and M2 and with baffles B1 and B2 if turbulent mixing is required. As the rate oxygen participates in the fermentation process is dependent on the rate of stirring, the motors are of a variable speed type or means such as gearing or a pulley drive are provided for varying the stirrer speeds for aerobic fermentations.

It is essential for the feeds to the culture vessels to be sterile and so all inputs from the atmosphere are through air filter units F1 and F6 as shown. The output from the reservoir R3 is also provided with a filter unit F7.

The first culture vessel V1 is provided with an inoculation port IP to permit the initial insulation of its contents with the bacteria.

The level of culture in the vessels V1 and V2 is determined by the height of the junctions J1 and J2 in the culture supply lines P1 and P2 from the vessels V1 and V2 respectively. Excess gas from the vessels passes through the upper outlet lines L1 and L2 so that a mixture of gas and culture is passed on to the receiving vessel V2 and R3 in each case.

Control equipment for maintaining the temperature and pH value of the cultures is provided independently for each culture vessel V1 and V2. The equipment for controlling the conditions in the vessel V1 is shown in FIGURE 3, equivalent and independent equipment being used for the vessel V2.

The equipment for controlling the pH vaule of the culture medium consists of standard reference and glass electrodes RE and GE immersed in the medium and electrically connected to a standard pH meter MR. A temperature compensator TC in a pocket in the base of the vessel V1 is also electrically connected to the meter MR so that the meter is temperature compensated. The pH meter MR controls an electronic controller EC which controls solenoid valves SV1 and SV2 so that acid (sulphuric acid) or alkali (sodium hydroxide) passes from the storage vessels R5 and R6 through the lines L5 and L6 into the culture vessel V1 as required to compensate for any unwanted changes in pH valve.

A suitable form of this automatic pH control apparatus is fully described in an article entitled "Automatic Control of pH Value in Cultures of Micro-organisms" by D. S. Callow and S. J. Pirt in the Journal of General Microbiology, vol. 14 (1956), at page 661.

As the operating conditions may be either endothermic or exothermic depending on the fermentation process, the temperature controlling arrangements include provision for both heating and cooling the culture medium. A resistance thermometer RT as shown informs a temperature controller T of the temperature of the culture medium and the controller T either energises a heater element HE to warm the medium or opens a solenoid valve SV3 to permit the passage of cold water through a pipe L7 to a cooling finger CF to cool the medium. These temperature controlling arrangements may be as described in the above described article by R. Elsworth et al. on page 272.

A particular application of the two-stage continuous fermentation process to the production of 2:3 butanediol from sucrose will now be described by way of example. This process is an aerobic one and conforms approximately to the equation:

$$C_{12}H_{22}O_{11}+O_2=2C_4H_{10}O_2+4CO_2+H_2O$$

The type of bacteria used by the process to be described is *Aerobacter aerogenes* (strain NCIB8017); other types, in particular, *Pseudomonas hydrophila* and *Bacillus polymyxa* may also be used.

The process uses the apparatus shown in FIGURES 2 and 3 in the following manner. Growth medium fed into the first culture vessel V1 from the reservoir R1 consists of a solution of sucrose at a concentration of about 100 gm./litre (the lower permissible limit being about 70 gm./litre) and traces of ammonium sulphate, magnesium sulphate, zinc sulphate, potassium phosphate and other nutrient salts with approximately an equimolar amount of a chelating agent, ethylenediamine tetracetic acid. Instead of pure sucrose, molasses to give the same concentration of sucrose and many other forms of carbohydrate, pure or impure, can be used. The conditions in the first vessel V1 are adjusted to give a high bacterial concentration and also a high output concentration of 2:3 butanediol (in terms of gms. of 2:3 butanediol/litre/hour). The process is operated at a throughput rate (measured as a dilution rate in each vessel) which is as high as possible while giving the high bacterial concentration and output concentration. Practicable throughput rates for the process require the dilution rate in the first vessel V1 to be of the order of 0.1 and 0.3 hour$^{-1}$, the apparatus working under capacity at lower rates and producing low yields of product at higher rates, while the temperature should be within the range 30° to 39° C., the pH value between 4.8 and 6.0 and the oxygen or air supply rate such as to maintain an oxygen take up rate by the culture of between about 25 and 100 millimols/litre/hour the rate increasing in this range as the dilution rate increases in its range 0.1 to 0.3 hour$^{-1}$, this being about half the rate that oxygen is absorbed by the solution as measured by the sulphite oxidation method. If the oxygen supply rate is insufficient the bacterial concentration falls and consequently the amount of sucrose utilised and all the product concentrations decrease. If the preferred oxygen supply rate is exceeded the concentration of 2:3 butanediol produced falls sharply and acetoin is produced in an increased proportion.

The proportion of carbon dioxide in the effluent gas (passing along the pipe A1) should be kept reasonably low, preferably between about 1 and 10%.

At the preferred dilution rate of about 0.2 hour$^{-1}$ in the first vessel the optimum conditions are: temperature 37° C., pH value 5.0 to 5.5 and oxygen take up rate 45 to 70 millimols/litre/hour. Under these conditions in the first vessel the bacterial dry weight concentration is about 7 gm./litre, the 2:3 butanediol concentration is about 20 gm./litre and the concentration of the by-product, acetoin, is about 4 gm./litre.

The range of practical dilution rates in the second stage vessel V2 is between about 0.025 and 0.15 hour$^{-1}$. The temperature in the second vessel V2 should be within the range 26° to 35° C., the pH value of the medium should be between 4.8 and 6.0 while the oxygen take up rate which should increase as the dilution rate increases should be about 10 millimols/litre/hour when the dilution rate is 0.05 hour$^{-1}$ and about 20 millimols/litre/hour when the dilution rate is 0.10 hour$^{-1}$, varying between about 5 and 30 millimols/litre/hour as the dilution rate varies from 0.025 to 0.15 hour$^{-1}$.

At a preferred dilution rate of between 0.05 and 0.10 hour$^{-1}$ the optimum conditions are a temperature of about 30° C. and a pH value of 5.0 to 5.5.

The storage reservoir R2 is arranged to supply additional sucrose to the second vessel V2 at such a rate as to maintain a slight excess (about 4 gm./litre) in the culture medium. The amount of sucrose utilised in the culture vessel V2 is about 80 gm./litre and the 2:3 butanediol concentration is over 50 gm./litre when the dilution rate is 0.08 hour$^{-1}$. With molasses as the source of sucrose the 2:3 butanediol concentration is more than 40 gm./litre at a dilution rate of 0.08 hour$^{-1}$.

We claim:

1. Apparatus for carrying out a continuous fermentation process for the formation of a given chemical product from a substrate by the action of a micro-organism and comprising a first culture vessel adapted to contain a first continuously fermenting culture medium, a first continuous feed device for supplying at a steady predetermined rate the first culture vessel with a growth medium for the micro-organism, a second culture vessel adapted to contain a second continuously fermenting culture medium fermenting simultaneously with the first culture medium, a second continuous feed device for supplying fermenting medium continuously at said predetermined rate from the first vessel to the second vessel, a third continuous feed device for supplying a medium containing said substrate direct to the second culture vessel continuously at a steady rate, and an output device for withdrawing medium from the second culture vessel at the rate medium is supplied to this vessel, a first control system for maintaining constant and homogeneous continuous culture conditions in the first vessel which are more favourable to the growth of the micro-organisms than to the formation of the chemical product, and a second control system for simultaneously maintaining constant and homogeneous culture conditions in the second vessel which are more favourable to the formation of the chemical product than to the growth of the micro-organisms.

2. Apparatus for carrying out a continuous fermentation process for the formation of a given chemical product from a substrate by the action of a micro-organism and comprising a first culture vessel adapted to contain a first continuously fermenting culture medium; a first continuous feed device for supplying at a steady predetermined rate the first culture vessel with a growth medium for the micro-organisms; a first control system for maintaining constant and homogeneous continuous culture conditions in the first culture vessel which are more favourable to the growth of the micro-organisms than to the formation of the chemical product and comprising a temperature controller for maintaining a constant temperature in the first culture vessel, a pH controller for maintaining a constant pH in the medium in the first culture vessel, a gas supply device for supplying gas to the first culture vessel at a required rate and an agitator for maintaining homogeneous conditions in the medium in the first culture vessel; a second culture vessel adapted to contain a second continuously fermenting culture medium fermenting simultaneously with the first culture medium; a second continuous feed device for supplying fermenting medium continuously at said predetermined rate from the first culture vessel to the second culture vessel; a third continuous feed device for supplying a medium containing said substrate direct to the second culture vessel continuously at a steady rate; an output device for withdrawing medium from the second culture vessel at the rate medium is supplied to this vessel; and a second control system for simultaneously maintaining constant and homogeneous continuous culture conditions in the second culture vessel which are more favourable to the formation of the chemical product than to the growth of the micro-organisms and comprising a second temperature controller for maintaining a constant temperature in the second culture vessel, a second pH controller for maintaining a constant pH value in the medium in the second culture vessel, a second gas supply device for supplying gas to the second culture vessel at a required rate, and a second agitator for maintaining homogeneous conditions in the medium in the second culture vessel.

3. Apparatus according to claim 2 for carrying out an aerobic fermentation process and in which the said gas supply device and said second gas supply device each supply oxygen at a controlled rate.

4. Apparatus according to claim 2 for carrying out an anaerobic fermentation process and in which the said gas supply device and said second gas supply device each supply an inert gas at a controlled rate.

5. Apparatus for carrying out a continuous fermentation process for the formation of penicillin from a substrate by the action of a mold *Penicillium chrysogenum* and comprising a first culture vessel adapted to contain a first continuously fermenting culture medium, a first continuous feed device for supplying at a steady predetermined rate the first culture vessel with a growth medium for the mold, a second culture vessel adapted to contain a second continuously fermenting culture medium fermenting simultaneously with the first culture medium, a second continuous feed device for sppplying fermenting medium continuously at said predetermined rate from the first vessel to the second vessel, a third continuous feed device for supplying a medium containing said substrate and a precursor of penicillin direct to the second culture vessel continuously at a steady rate, and an output device for withdrawing medium from the second culture vessel at the rate medium is supplied to this vessel, a first control system for maintaining constant and homogeneous continuous culture conditions in the first vessel which are more favourable to the growth of the mold than to the formation of penicillin, and a second control system for simultaneously maintaining constant and homogeneous culture conditions in the second vessel which are more favourable to the formation of penicillin than to the growth of the mold.

6. Apparatus for carrying out a continuous fermentation process for the formation of 2:3 butanediol from a sugar such as sucrose by the action of bacteria and comprising a first culture vessel adapted to contain a continuously fermenting culture medium, a first continuous feed device for supplying the first culture vessel with a growth medium containing the sugar at a concentration of the order of 100 gm./litre with nutrient salts, a gas supply device for supplying oxygen continuously to the first culture vessel, the rates at which oxygen and growth medium are supplied being such that the oxygen take rate is between about 25 and 100 millimols/litre/hour while the dilution rate is between about 0.1 and 0.3 hour$^{-1}$, the two rates increasing approximately in step with each other in these ranges, a first temperature controller for maintaining the temperature in the first culture vessel between about 30° and 39° C. and a first pH controller for maintaining the pH value between about 4.8 and 6.0, a second continuous feed device for maintaining the volume of medium in the first culture vessel constant by feeding the second culture vessel therefrom with output medium at the rate medium is supplied to the first culture vessel, a third continuous feed device for feeding the second culture vessel continuously direct with medium containing the sugar at a rate to maintain a slight excess of sugar in the second culture vessel to be converted by the bacteria, an output device for withdrawing medium from the second culture vessel at the total rate medium is supplied so that a volume of medium is maintained in the second culture vessel which is greater than the volume maintained in the first culture vessel, the dilution rate in the second culture vessel being between about 0.025 and 0.15 hour$^{-1}$, a second gas supply device for supplying oxygen continuously to the second culture vessel so that the oxygen take up rate varies between about 5 and 30 millimols/litre/hour as the dilution rate varies in its range from about 0.025 to 0.15 hour$^{-1}$, a second temperature controller for maintaining the temperature in the second stage between about 26° and 35° C., and a second pH controller for controlling the pH value between about 4.8 and 6.0.

References Cited in the file of this patent

UNITED STATES PATENTS

| | | |
|---|---|---|
| 1,750,267 | Harrison | Mar. 11, 1930 |
| 1,818,530 | Boye | Aug. 11, 1931 |
| 1,849,053 | Bernhauer et al. | Mar. 15, 1932 |
| 1,875,536 | Wheeler et al. | Sept. 6, 1932 |
| 2,529,061 | Melle et al. | Nov. 7, 1950 |
| 2,609,327 | Kolachov et al. | Sept. 2, 1952 |
| 2,394,031 | Waksman et al. | Feb. 5, 1956 |
| 2,750,328 | Stimpson et al. | June 12, 1956 |
| 2,906,670 | Borrow et al. | Sept. 29, 1959 |